Patented Aug. 11, 1931

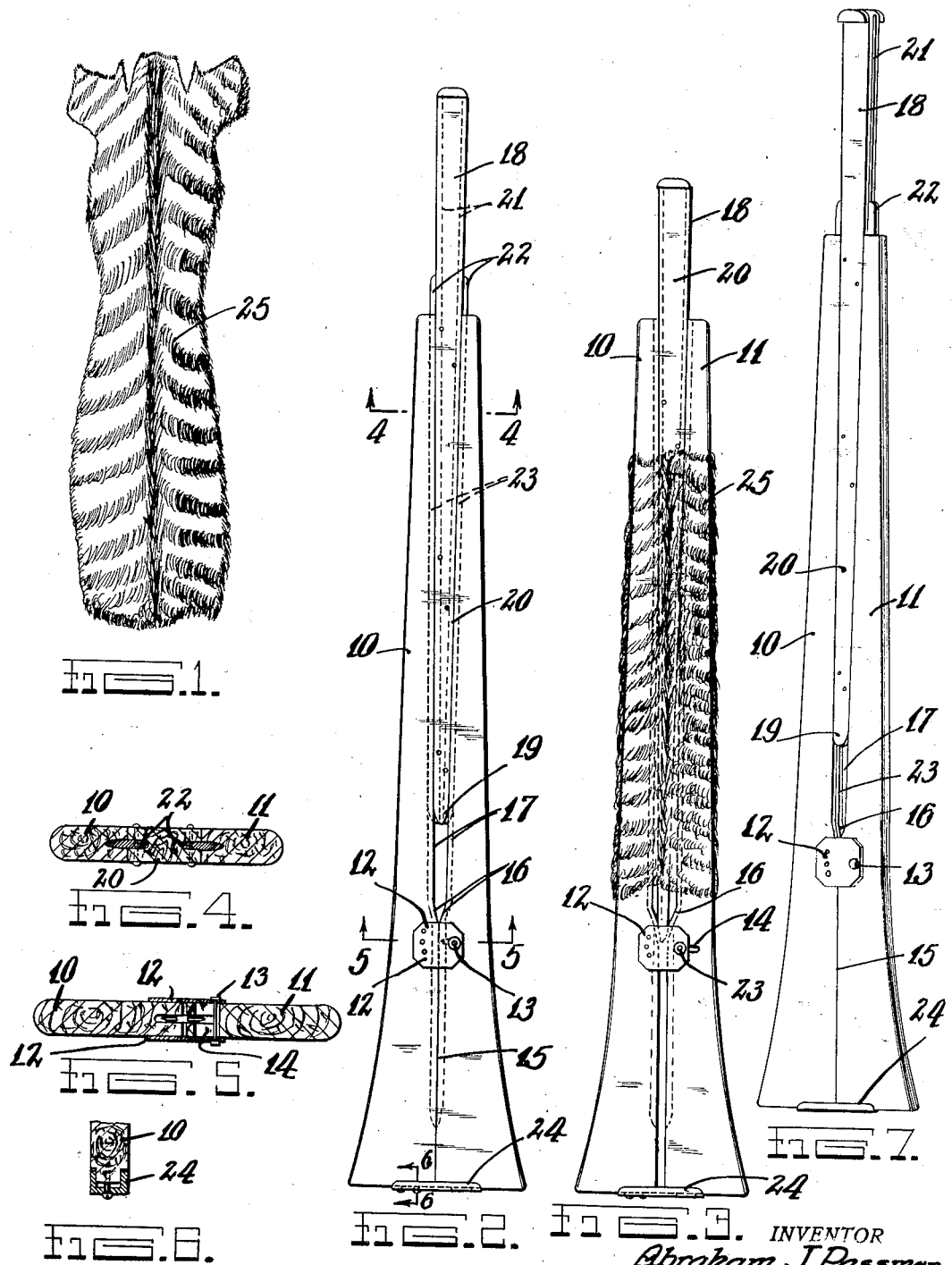

1,818,577

UNITED STATES PATENT OFFICE

ABRAHAM J. PASSMAN, OF NEW YORK, N. Y.

STRETCHER FOR NECKWEAR SKINS

Application filed May 27, 1929. Serial No. 366,260.

This invention relates to new and useful improvements in fur stretchers.

The invention has for an object the provision of a device of the class mentioned which is of simple durable construction, dependable in use and efficient in action and which may be manufactured and sold at a reasonable cost.

The invention proposes adjacent form elements with substantially one-quarter of their adjacent bottom sides parallel and normally touching, and the remaining three-quarters of their adjacent sides tapered, said taper consisting of a bottom short tapered portion and a top slight long tapered portion, and the form elements being held together so as to permit a slight lateral movement, and a spreader rod with a sharp bottom short taper and with a top slight long taper slidably mounted between the form elements.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:—

Fig. 1 is an elevational view of a fur skin for which the stretcher is designed.

Fig. 2 is a side elevational view of a fur stretcher constructed according to this invention.

Fig. 3 shows the fur skin illustrated in Fig. 1 applied upon the stretcher shown in Fig. 2.

Fig. 4 is a horizontal sectional view taken on the line 4—4 of Fig. 2.

Fig. 5 is a horizontal sectional view taken on the line 5—5 of Fig. 2.

Fig. 6 is a fragmentary vertical sectional view taken on the line 6—6 of Fig. 2.

Fig. 7 is a perspective view of the fur stretcher.

The fur stretcher is formed of a frame consisting of a pair of adjacent form elements 10 and 11, respectively, and front and rear plates 12 attached upon the front and rear faces of one of the form elements and extending over the corresponding faces of the other form element, and a bolt 13 connected between the plates passes thru a slot 14 in the latter mentioned form element.

The adjacent faces of the form elements have a portion parallel and normally touching each other for about one-quarter the length measuring from the bottom ends of the form element and indicated by reference numeral 15, the remaining three-quarter lengths of the adjacent faces of the form elements are tapered and spaced from each other. The tapered portion consists of two distinct tapers, a bottom sharp tapered portion indicated by reference numeral 16 and a top long slight tapered portion indicated by numeral 17. The bottom ends of the form elements broaden out so as to be quite stiff and not flexible. The top ends, as may be seen from an inspection of the drawing, are quite thin and for this reason the top portions are flexible. The form elements should preferably be made of wood having a good spring so as to provide great flexibility.

A spreader bar 18 has a bottom short sharp tapered portion 19 and a top long tapered portion 20. This spreader bar is provided with side grooves 21, and longitudinal tongues 22 are secured within these grooves and project beyond the sides of the spreader bar. These tongues engage in grooves 23 in the adjacent faces of the form elements. A channel guide 24 is attached upon one of the form elements and frictionally engages the other. This channel guide is positioned on the bottom of the form elements.

In Fig. 1, a fur skin 25 has been shown. Attention is directed to the edges of the fur skin which are quite irregular. This fur skin may be tacked or otherwise secured upon the form elements of the fur stretcher. When the skin is secured in place—care should be taken to see that the spreader bar 18 is in a raised position. After engagement of the fur skin upon the form elements the spreader bar is forced downwardly. The long taper of the spreader bar acts against the long taper of the form elements and slowly spreads the top of the form elements, thus stretching the fur skin. After the bar has been forced down so that the short taper of the bar engages against the short taper of the form elements, a continued forcing downwards of the spreader bar causes the form elements to separate as shown in Fig. 3. The spreading stretches the lower portion of the fur skin, the flexibility of the top ends of the form elements being depended upon to allow a spreading of the bottom of the form elements while the tops remain stationary. Bolt 13 acting in the slot 14 prevents complete disengagement of the form elements from each other.

While I have shown and described the preferred embodiment of my invention, it is to be understood that I do not limit myself to the precise construction herein disclosed and the right is reserved to all changes and modifications coming within the scope of the invention as defined in the appended claims.

Having thus described my invention, what I claim as new, and desire to secure by United States Letters Patent is.

1. A fur stretcher, comprising adjacent form elements slidably connected to allow slight lateral motion into spaced positions, and a spreader bar slidably mounted between the form elements and having tapered sides angularly spreading the form elements during the major portion of its slidable movement and having a sharp tapered point engageable against a corresponding tapered portion on adjacent sides of said form element and intermediate of the ends of the form elements moving the form elements into spaced positions during the remainder portion of its slidable movement.

2. A fur stretcher, comprising adjacent form elements, plates attached upon one of the form elements, a bolt connected between the plates and passing thru a slot in the other form element permitting lateral motion into spaced positions, and a spreader bar slidably mounted between the form elements and having tapered sides for angularly spreading the form elements during the major portion of its slidable movement and during the remaining movement move the form elements into spaced positions, the spreader bar being formed with a bottom point and a top slight long tapered portion and the adjacent sides of said form elements consisting of portions with slight long tapers and spaced from each other and connecting with portions touching each other. The spreader bar during the major portion of its slidable motion engages its slight long tapered portion against the tapered spaced portions of the adjacent sides of said form elements and during the remaining movement its point engages in between the touching portions of said form elements.

3. A fur stretcher, comprising adjacent form elements, plates attached upon one of the form elements, a bolt connected between the plates and passing thru a slot in the other form element permitting lateral motion into spaced positions, and a spreader bar slidably mounted between the form elements and having tapered edges angularly spreading the form elements during the major portion of its slidable movement and during the remaining movement move the form elements into spaced positions, the spreader bar being formed with a bottom sharp short tapered portion and a top slight long tapered portion, and the inner sides of the form elements being similarly arranged.

In testimony whereof I have affixed my signature.

ABRAHAM J. PASSMAN.